United States Patent
Xiao et al.

(10) Patent No.: US 11,062,524 B2
(45) Date of Patent: Jul. 13, 2021

(54) AUGMENTED REALITY APPARATUS, SYSTEM AND METHOD, AND COMPUTER-READABLE STORAGE MEDIUM

(71) Applicant: Sony Corporation, Tokyo (JP)

(72) Inventors: Kai Xiao, Beijing (CN); Qi Zheng, Beijing (CN); Zhongsheng Hong, Beijing (CN); Jia Han, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/992,133

(22) Filed: Aug. 13, 2020

(65) Prior Publication Data

US 2020/0372720 A1 Nov. 26, 2020

Related U.S. Application Data

(63) Continuation of application No. 16/019,605, filed on Jun. 27, 2018, now Pat. No. 10,777,011.

(51) Int. Cl.
*G06T 19/00* (2011.01)
*G01C 21/20* (2006.01)
*G02B 27/01* (2006.01)

(52) U.S. Cl.
CPC .......... *G06T 19/006* (2013.01); *G01C 21/206* (2013.01); *G02B 27/01* (2013.01); *G06T 19/003* (2013.01); *G02B 2027/014* (2013.01); *G02B 2027/0138* (2013.01)

(58) Field of Classification Search
CPC .................................................. G06T 19/006
USPC .......................................................... 345/633
See application file for complete search history.

(56) References Cited

U.S. PATENT DOCUMENTS

| 9,841,814 | B1 | 12/2017 | Kallmeyer et al. |
| 10,127,731 | B1 | 11/2018 | Ozery |
| 2016/0300179 | A1 | 10/2016 | Aviles |
| 2016/0321791 | A1* | 11/2016 | Cabrera-Cordon ......... G06T 19/003 |
| 2018/0020312 | A1* | 1/2018 | Visser ................ G06F 3/017 |

* cited by examiner

*Primary Examiner* — Shivang I Patel
(74) *Attorney, Agent, or Firm* — Xsensus LLP

(57) ABSTRACT

An electronic apparatus, a wireless communication system, a wireless communication method, and a computer-readable storage medium are provided. The electronic apparatus includes a processing circuit configured to: determine a current audiovisual angle of a user; compare the current audiovisual angle of the user with an expected audiovisual angle, and generate indication information for directing the user to the expected audiovisual angle, and provide the indication information to the user. The indication information directs the user to the expected audiovisual angle by using a direct direction indication and an indirect direction indication. With the electronic apparatus, the wireless communication system, the wireless communication method, and the computer-readable storage medium, the user can obtain a better visual feeling, and thus the user experience can be improved.

22 Claims, 11 Drawing Sheets

AUGMENTED REALITY APPARATUS, SYSTEM AND METHOD, AND COMPUTER-READABLE STORAGE MEDIUM

CROSS-REFERENCE TO RELATED APPLICATIONS

This application is a continuation of U.S. application Ser. No. 16/019,605, filed Jun. 27, 2018, which claims the benefit and priority of Chinese Application No. 201711474462.7, filed on Dec. 29, 2017, the entire disclosure of each of which is incorporated herein by reference.

FIELD

Embodiments of present disclosure generally relate to the field of wireless communications, and in particular to an electronic apparatus in a wireless communication system, a wireless communication system including the electronic apparatus, a wireless communication method performed by the electronic apparatus, and a computer-readable storage medium.

BACKGROUND

The augmented reality (AR) technology is a technology in which the position and angle of a camera image are calculated in a real-time manner and corresponding images, videos, and three-dimensional (3D) models are added to the camera image. The technology is intended to nest a virtual world in a real word on a screen and perform the interaction. The augmented reality technology is a new technology in which the real world information is seamlessly integrated with the virtual world information. The virtual information is applied in the real world and then is sensed by a user to achieve a sensory experience that goes beyond reality. The AR device is used by the user to combine the real world with the virtual world, and thus the user can be in a mixed world.

In a scenario in which a user wears or carries an AR device, the user generally desires to obtain preferred route indication information since the user is in a mixture of the virtual world and the real world. For example, in a scenario in which a visitor visits a visiting area, the visitor generally desires to obtain a preferred visiting route. In addition, in a scenario in which a customer is shopping in a shopping mall or supermarket, the customer generally desires to obtain a preferred shopping route.

Therefore, it is necessary to provide a solution to direct a user in an AR scenario, so that the user can obtain a better visual feeling, and thus the user experience can be improved.

SUMMARY

This part provides an overview of the present disclosure, rather than a full scope or all features of the present disclosure.

An object of the present disclosure is to provide an electronic apparatus, a wireless communication system, a wireless communication method, and a computer-readable storage medium, so that a user can obtain a better visual feeling, and thus the user experience can be improved.

According to an aspect of the present disclosure, an electronic apparatus is provided. The electronic apparatus includes a processing circuit. The processing circuit is configured to: determine a current audiovisual angle of a user; compare the current audiovisual angle of the user with an expected audiovisual angle, and generate indication information for directing the user to the expected audiovisual angle; and provide the indication information to the user. The indication information directs the user to the expected audiovisual angle by using a direct direction indication and an indirect direction indication.

According to another aspect of the present disclosure, a wireless communication system is provided. The wireless communication system includes one or more augmented reality AR devices, a control device and a server. Each AR device is configured to: determine a current audiovisual angle of a user wearing or carrying the AR device; compare the current audiovisual angle of the user with an expected audiovisual angle and generate indication information for directing the user to the expected audiovisual angle; and provide the indication information to the user. The control device is configured to display information of each AR device. The server is configured to transmit information associated with a real object to be displayed to each AR device. The indication information directs the user to the expected audiovisual angle by using a direct direction indication and an indirect direction indication.

According to another aspect of the present disclosure, a wireless communication method is provided. The wireless communication method includes: determining a current audiovisual angle of a user; comparing the current audiovisual angle of the user with an expected audiovisual angle and generating indication information for directing the user to the expected audiovisual angle; and providing the indication information to the user. The indication information directs the user to the expected audiovisual angle by using a direct direction indication and an indirect direction indication.

According to another aspect of the present disclosure, a computer-readable storage medium is provided. The computer-readable storage medium includes computer-executable instructions which, when executed by a computer, cause the computer to perform the wireless communication method according to the present disclosure.

With the electronic apparatus in a wireless communication system, the wireless communication system, the wireless communication method, and the computer-readable storage medium according to the present disclosure, the electronic apparatus may generate indication information by comparing a current audiovisual angle of a user with an expected audiovisual angle, to direct the user to the expected audiovisual angle. In this way, the user can be directed so that the user can get a better visual feeling, and thus the user experience can be improved.

Further applicability range is apparent from the description provided herein. The description and specific examples in the overview are merely for the purpose of illustration and are not intended to limit the scope of the present disclosure.

BRIEF DESCRIPTION OF THE DRAWINGS

The drawings described herein are provided merely for the purpose of illustrating the selected embodiments rather than all possible embodiments, and are not intended to limit the scope of the present disclosure. In the drawings.

Figure 1:
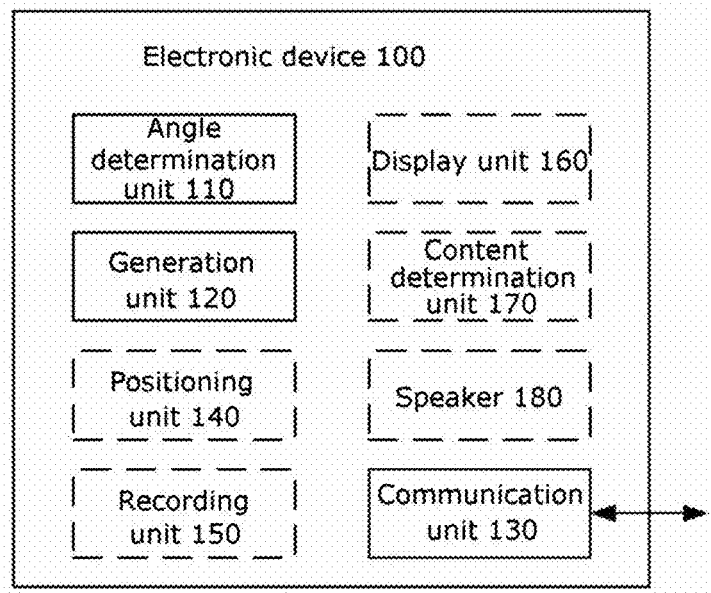
FIG. 1 is a block diagram showing a structure of an electronic apparatus according to an embodiment of the present disclosure.

While specific embodiments of the present disclosure are shown as examples in the drawings and are described herein in detail, various modifications and variations may be made to the present disclosure. It should be understood that the description for the specific embodiments herein is not intended to limit the present disclosure to the disclosed specific forms, and the present disclosure is intended to encompass all modifications, equivalents and alternatives that fall within the spirit and scope of the present disclosure. It should be noted that reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as specific parts, devices and methods are set forth to provide thorough understanding for the embodiments of the present disclosure. It is apparent to those skilled in the art that the exemplary embodiments may be embodied in many different forms without the specific details, and the specific details are not interpreted as a limit for the scope of the present disclosure. In some exemplary embodiments, well-known processes, well-known structures and well-known technology are not described in detail.

The present disclosure is described below in the following order:

1. Configuration Example of Electronic Device;
2. Configuration Example of Wireless Communication System;
3. Configuration Example of Wireless Communication Method;
4. Application Example.

1. Configuration Example of Electronic Device

FIG. 1 is a block diagram showing a structure of an electronic apparatus 100 according to an embodiment of the present disclosure. As shown in FIG. 1, the electronic apparatus 100 may include an angle determination unit 110, a generation unit 120 and a communication unit 130.

In this embodiment, each unit of the electronic apparatus 100 may be included in a processing circuit. It should be noted that the electronic apparatus 100 may include one processing circuit or multiple processing circuits. Further, the processing circuit may include various discrete functional units to perform various different functions and/or operations. It should be noted that the functional units may be physical entities or logical entities, and units referred to as different names may be implemented as a same physical entity.

According to the embodiment of the present disclosure, the angle determination unit 110 may determine a current audiovisual angle of a user.

According to the embodiment of the present disclosure, the generation unit 120 may compare the current audiovisual angle of the user with an expected audiovisual angle, and generate indication information for directing the user to the expected audiovisual angle.

According to the embodiment of the present disclosure, the communication unit 130 may provide the indication information to the user.

According to the embodiment of the present disclosure, the indication information may direct the user to the expected audiovisual angle by using a direct direction indication and an indirect direction indication.

Therefore, with the electronic apparatus according to the present disclosure, the indication information is generated by comparing the current audiovisual angle of the user with the expected audiovisual angle to direct the user to the expected audiovisual angle. In this way, the user can be directed so that the user can obtain a better visual feeling, and thus the user experience can be improved.

The embodiments of the present disclosure are described below by taking a scenario in which a visiting area is visited as an example. It should be understood by those skilled in the art that the present disclosure may also be applied in other scenarios in which a user needs to be directed.

Figure 2:
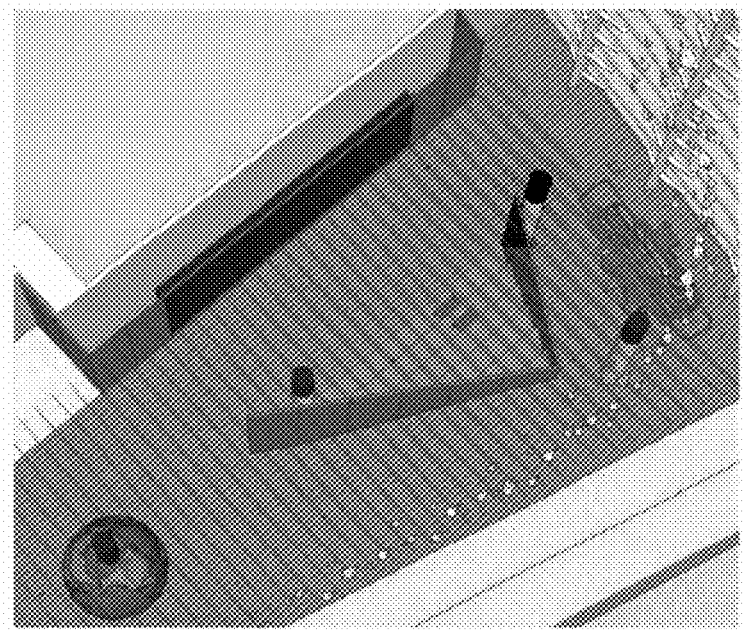
FIG. 2 is a top view showing a visiting area according to an embodiment of the present disclosure.

FIG. 2 is a top view showing a visiting area according to an embodiment of the present disclosure. A visitor wants to visit the visiting area shown in FIG. 2.

Figure 3:
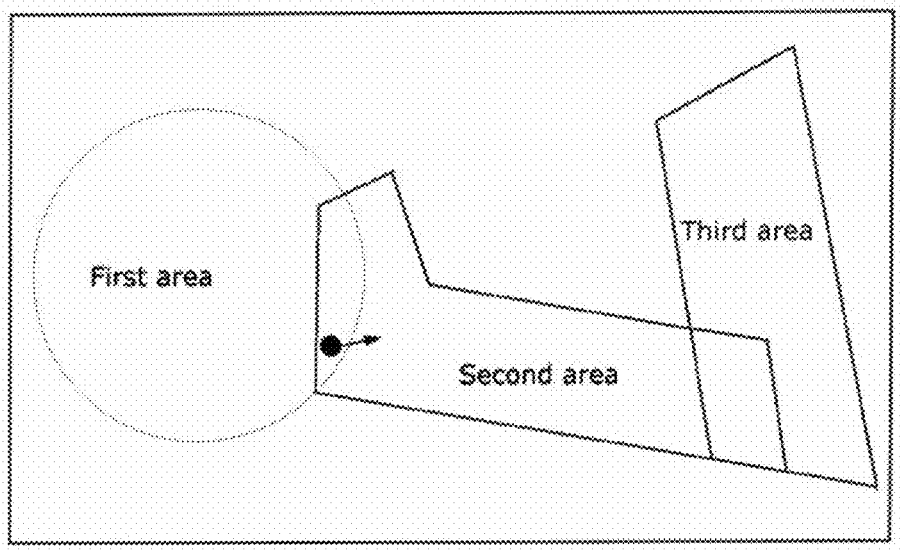
FIG. 3 is a simplified schematic diagram showing division of the visiting area shown in FIG. 2.

According to the embodiment of the present disclosure, the entire visiting area may be divided into multiple areas. FIG. 3 is a simplified schematic diagram showing division of the visiting area shown in FIG. 2. As shown in FIG. 3, the visiting area shown in FIG. 2 is divided into three areas including a first area, a second area and a third area. In this embodiment, it is assumed that, a manager of the visiting area wants the visitor to visit in the order of the first area—the second area—the third area, and a preferred visiting route is designed. According to an embodiment of the present disclosure, the electronic apparatus 100 may generate indication information by comparing a current audiovisual angle of a user and an expected audiovisual angle, to direct the user to the expected audiovisual angle. Therefore, in the diagram shown in FIG. 3, in a case that the user has visited the first area and is located at a position of a black solid circle, the user may be instructed to proceed to the second area as indicated by an arrow to visit.

According to the embodiment of the present disclosure, the electronic apparatus 100 may be an AR device that is used to be worn or carried by the user. For example, the AR device may be a wearable AR device (e.g., VR glasses, a VR helmet), or other user devices (e.g., a smartphone with dual cameras) capable of implementing the VR function.

According to the embodiment of the present disclosure, the audiovisual angle refers to an angle in which the user can watch and listen. In this embodiment, since the electronic apparatus 100 is worn or carried by the user, the electronic apparatus 100 may determine the current audiovisual angle of the user. In certain space, in a case that the user is located at different positions, or in a case that the user watches in different line-of-sight directions at the same position, content seen by the user is different. That is, in a case that the position and the line-of-sight direction of the user are determined, the audiovisual angle of the user may be determined. Therefore, the angle determination unit 110 may determine the current audiovisual angle of the user based on position information and line-of-sight direction information of the user. Practically, the angle determination unit 110 may also determine the current audiovisual angle of the user by using other methods, which is not limited in the present disclosure.

According to the embodiment of the present disclosure, the generation unit 120 may determine an expected audiovisual angle and generate the indication information by comparing the current audiovisual angle and the expected audiovisual angle.

According to the embodiment of the present disclosure, the generation unit 120 may determine the expected audiovisual angle based on a current position of the user. As shown in FIG. 1, the electronic apparatus 100 may include a positioning unit 140 configured to perform positioning on the user and transmit a position of the user to the generation unit 120. That is, the expected audiovisual angle may be associated with the position. In this case, in a case that two different users are located at the same position, expected audiovisual angles of the two users are the same. In this embodiment, the generation unit 120 may determine the expected audiovisual angle at each position based on a preset preferred travel route, to expect a real travel route of the user to be as close as possible to the preferred travel route. For example, in the example shown in FIG. 3, in a case that the user is located at the position of the black solid circle, the user has visited the first area with a high probability and should be prepared to visit the second area. Therefore, it may be determined that the user should proceed to the second area, and the direction indicated by the arrow may be determined based on the preferred travel route.

According to the embodiment of the present disclosure, the generation unit 120 may also determine the expected audiovisual angle based on the current position of the user and travel history information of the user. As shown in FIG. 1, the electronic apparatus 100 may include a recording unit 150 configured to record travel history of the user and store the travel history of the user. Further, the recording unit 150 may transmit the travel history information of the user to the generation unit 120. That is, the expected audiovisual angle may be associated with the position and the travel history information of the user. In this case, in a case that two different users are located at the same position, the expected audiovisual angles of the two users may be different due to different travel history. In this embodiment, the generation unit 120 may determine the expected audiovisual angle at each position based on a preset preferred travel route and the travel history information of the user, to expect a real travel route of the user to be as close as possible to the preferred travel route and ensure that the user can proceed to each area. For example, in the example shown in FIG. 3, in a case that the user is at the position of the black solid circle, if the generation unit 120 determines that the user has visited the first area based on the travel history information of the user, it may be determined that the user should proceed to the second area, and the direction indicated by the arrow may be determined based on the preferred travel route. In addition, if the generation unit 120 determines that the user does not visit the first area based on the travel history information of the user, it may be determined that the user should return to the first area, and a specific direction may be determined based on the preferred travel route.

According to the embodiment of the present disclosure, the user may be directed to the expected audiovisual angle by directing a direction. That is, the indication information generated by the generation unit 120 may include direction information of the expected audiovisual angle, and the communication unit 130 may provide the direction information of the expected audiovisual angle to the user. That is, the user may reach the expected audiovisual angle by traveling in the direction of the expected audiovisual angle.

According to the embodiment of the present disclosure, the indication information may direct the user to the expected audiovisual angle by using a direct direction indication and an indirect direction indication. Specifically, the indication information may direct the user to the direction of the expected audiovisual angle by using the direct direction indication and the indirect direction indication.

According to the embodiment of the present disclosure, the direct direction indication is used to direct the user to the direction of the expected audiovisual angle with an explicit visual identification. That is, the explicit visual identification may indicate the direction of the expected audiovisual angle in a direct and explicit manner. For example, the explicit visual identification may include an icon identification (e.g., one or more arrow icons, finger icons, and other icons capable of indicating a direction).

According to the embodiment of the present disclosure, the indirect direction indication is used to direct the user to the direction of the expected audiovisual angle with an aural identification or an implicit visual identification. That is, the implicit visual identification may indicate the direction of the expected audiovisual angle in an indirect and implicit manner, and the aural identification may also indicate the direction of the expected audiovisual angle in an indirect manner.

According to the embodiment of the present disclosure, as shown in FIG. 1, the electronic apparatus 100 may further include a display unit 160. Both the explicit visual identification and the implicit visual identification may be displayed in a display area of the display unit 160. More specifically, the display area may include a first display area and a second display area. The explicit visual identification is provided in the first display area of the electronic apparatus 100, and the implicit visual identification is provided in the second display area of the electronic apparatus 100. According to the embodiment of the present disclosure, the first display area may be a primary display area of the electronic apparatus 100, and the second display area may be a secondary display area of the electronic apparatus 100. In other words, the first display area may be closer to a center of the entire display area than the second display area. In addition, an area of the first display area may be greater than an area of the second display area.

According to the embodiment of the present disclosure, as shown in FIG. 1, the electronic apparatus 100 may further include a speaker 180 configured to play the aural identification.

According to the embodiment of the present disclosure, the aural identification may prompt the user for an aural source direction, and the implicit visual identification may prompt the user for a visual source direction. In this way, after the user sees the implicit visual identification or hears the aural identification, the user cannot intuitively know the direction of the expected audiovisual angle, but only can know the visual or aural source direction, thereby indirectly knowing the direction of the expected audiovisual angle.

According to the embodiment of the present disclosure, the indirect direction indication may indicate information associated with an area in the direction of the expected audiovisual angle, including one or more of sound information associated with the area (e.g., a portion of sound information that can be heard in a case that the user is located in the area), light information associated with the area (e.g., light in the direction of the area in the display area is bright, and light at other positions in the display area is dark), and animation information associated with the area (for example, a portion of animation information that can be seen in the case that the user is located in the area). That is, the aural identification may include sound information associated with the area, thus prompting the user that an aural source is located in which area. The implicit visual identification may include light information associated with the area and animation information associated with the area, thus prompting the user that a visual source is located in which area.

As described above, various embodiments of the direct direction indication and the indirect direction indication are introduced. It should be understood by those skilled in the art that the direct direction indication may include one or more types of indication information, i.e., a combination of the embodiments of the direct direction indication described above. The indirect direction indication may also include one or more types of indication information, i.e., a combination of the embodiments of the indirect direction indication described above. The indication information that is ultimately presented to the user includes at least one direct direction indication and at least one indirect direction indication. For example, the indirect direction indication may include only an aural identification or only an implicit visual identification, and may also include both an aural identification and an implicit visual identification. In addition, the implicit visual identification may include only light information associated with the area in the direction of the expected audiovisual angle or only animation information associated with the area in the direction of the expected audiovisual angle, and may also include both light information and animation information associated with the area in the direction of the expected audiovisual angle.

Figure 4:
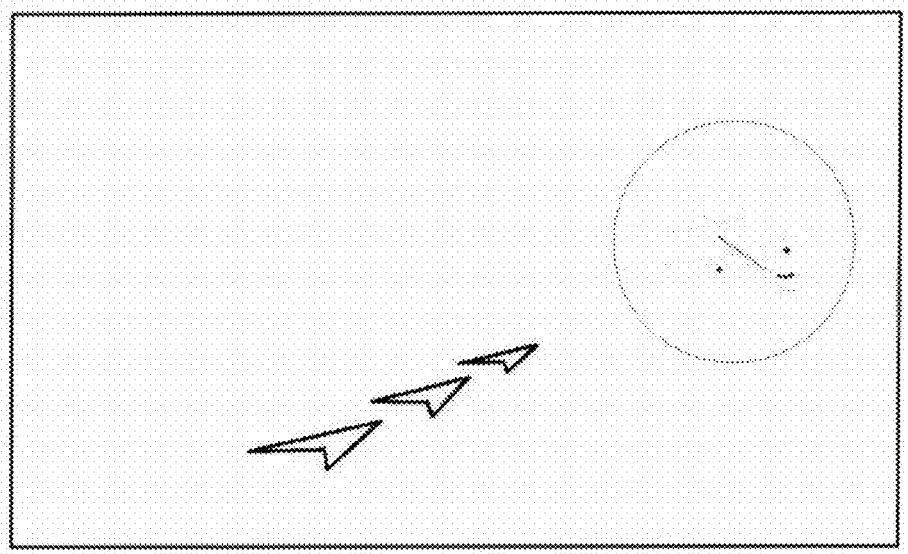
FIG. 4 is a schematic diagram showing indication information according to an embodiment of the present disclosure.

FIG. 4 is a schematic diagram showing indication information according to an embodiment of the present disclosure. FIG. 4 shows the entire display area of the electronic apparatus 100. As shown in FIG. 4, the direct direction indication includes an icon identification shown by three hollow arrows. The icon identification may direct the user to the direction of the expected audiovisual angle with an explicit visual identification. In a case that the user sees the icon identification, the user can intuitively know that the user should travel in the direction indicated by the arrows. Further, as shown in FIG. 4, the indirect direction indication includes animation information associated with the second area. The animation information may direct the user to the direction of the expected audiovisual angle with an implicit visual identification. In a case that the user sees the animation information, the user can know that the user should travel to the area associated with the animation information, but cannot intuitively know the travel direction. Further, the area (i.e., a circular area) in which the animation information shown in FIG. 4 is located may be the second display area, and an area other than the second display area in the entire display area may be the first display area. As shown in FIG. 4, the first display area is located at the center of the entire display area and has a large area, while the second display area is located at the edge of the entire display area and has a small area. In this way, the user can see the direct direction indication more conveniently and easily. The indirect direction indication only serves as the indication information for auxiliary reference. FIG. 4 only shows an embodiment in which the indirect direction indication is an implicit visual identification. In a case that the indirect direction indication is an aural identification, only the direct direction indication is displayed in the display area, and the speaker may play the indirect direction indication.

As described above, the electronic apparatus 100 may generate indication information for directing the user to an expected audiovisual angle, to better direct the user carrying or wearing the AR device. The indication information is particularly applied to an overlapping area of the two areas so that the electronic apparatus 100 can direct the user to a reasonable route at any time and at any position.

According to the embodiment of the present disclosure, the electronic apparatus 100 may further include a content determination unit 170 configured to determine audiovisual content to be presented to the user. In this embodiment, the audiovisual content may include displayed content and sound content. Further, the electronic apparatus 100 may present the displayed content to the user by the display unit 160, i.e., display the displayed content in the display area of the display unit 160, and the electronic apparatus 100 may present the sound content to the user with the speaker 180, i.e., play the sound content by the speaker 180.

According to the embodiment of the present disclosure, the displayed content may include a real object layer and a virtual object layer. The virtual object layer includes a virtual object corresponding to a real object and other virtual objects. It is well known that, the AR technology is intended to nest a virtual world in a real world on a screen and perform the interaction. Therefore, the real object layer may include a real object in the real world, and the virtual object layer may include a virtual object in the virtual world. The virtual object may include a virtual object corresponding to the real object and other virtual objects than the virtual object corresponding to the real object. The virtual object corresponding to the real object may be display by being overlaid on the real object. For example, in a case that a table which is a real object in the real world exists in the space where the user is located, the same real object as the table is displayed in the real object layer. The virtual object layer may include a virtual table corresponding to the real table. In the display area, the virtual table is overlaid on the real table. Further, the displayed virtual table may be different from the real table, for example, may include some 3D display effect. In addition, the virtual object layer further includes virtual objects to which no real object corresponds. For example, information such as brand information and size information of the table may be displayed. The virtual objects to which no real object corresponds may also be displayed in the display area, and are referred to as "other virtual objects" herein.

The audiovisual content presented to the user is described below by taking the visiting area shown in FIG. 2 as an example.

Figure 5:
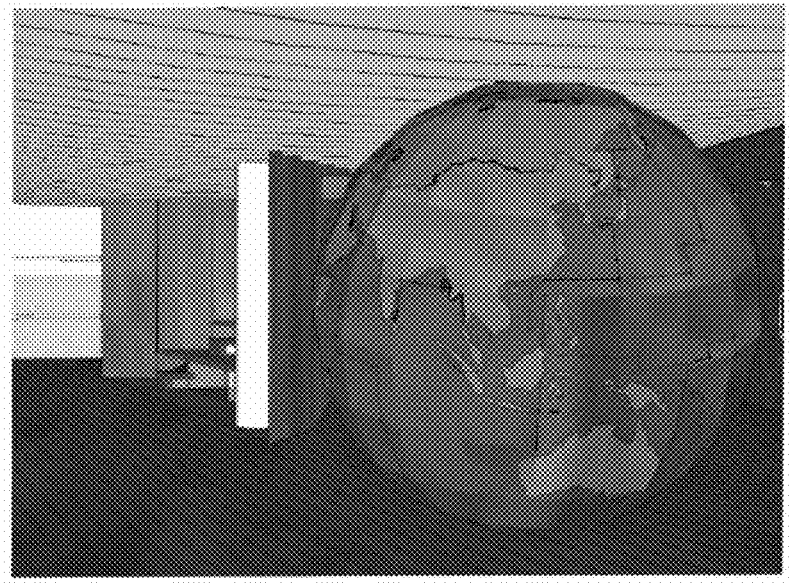
FIG. 5 is a schematic diagram showing displaying of a real object layer of a first area in FIG. 2.

FIG. 5 is a schematic diagram showing displaying of a real object layer of the first area in FIG. 2. As shown in FIG. 5, the first area includes a wooden terrestrial globe. The terrestrial globe shows continents and oceans on the earth on a certain scale, and shows air route information of different airlines. Since the wooden terrestrial globe is located in the real world, the wooden terrestrial globe may be displayed in the real object layer. A virtual object corresponding to the terrestrial globe overlaid on the terrestrial globe, such as a simulated real earth, may be displayed in the virtual object layer of the first area, and continents and oceans displayed on the simulated real earth are the same as those on the real earth viewed by a satellite. Further, some other virtual objects may also be display in the virtual object layer of the first area, such as identification information of airlines of each air route, and detailed information of the air route.

Figure 6A:
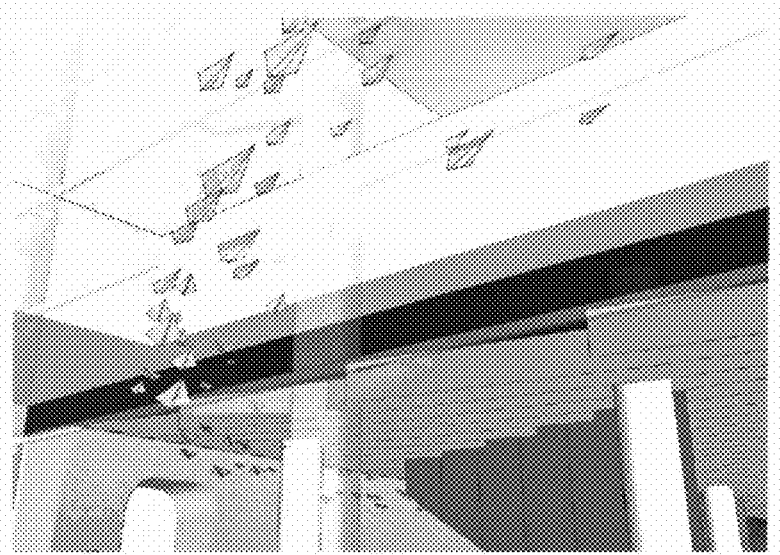
FIG. 6(a) is a schematic diagram showing displaying of a real object layer of a second area in FIG. 2.
Figure 6B:
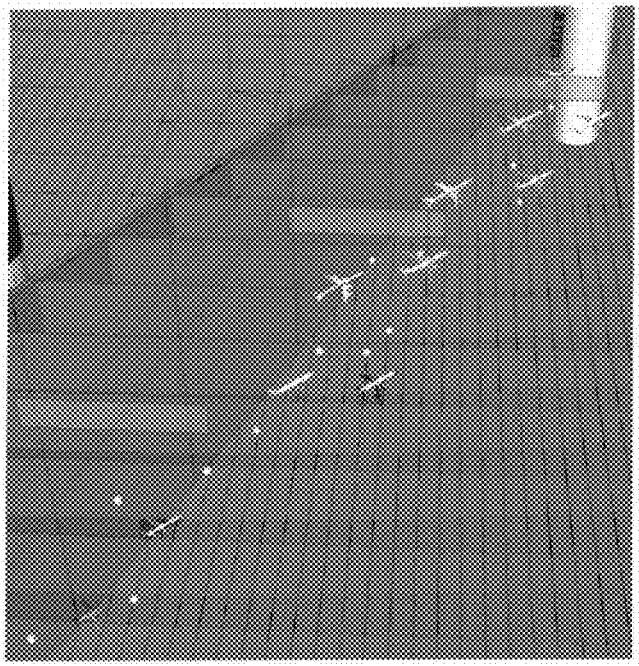
FIG. 6(b) is a schematic diagram showing displaying of a virtual object layer of the second area in FIG. 2.
Figure 6C:
FIG. 6(c) is a schematic diagram showing displaying of the virtual object layer of the second area in FIG. 2.

FIG. 6(a) is a schematic diagram showing displaying of a real object layer of the second area in FIG. 2. As shown in FIG. 6(a), the second area includes several paper airplanes suspended in the air. The several paper airplanes extend from a boundary between the first area and the second area to a boundary between the second area and the third area. Since the paper airplanes are located in the real world, the paper airplanes may be displayed in the real object layer. FIG. 6(b) is a schematic diagram showing displaying of a virtual object layer of the second area in FIG. 2. As shown in FIG. 6(b), virtual objects respectively corresponding to the paper airplanes overlaid on the paper airplanes, such as several airplane models, may be displayed in the virtual object layer of the second area. The several airplane models may be, for example, airplane models of different eras. Since the several airplane models are overlaid on the paper airplanes, no paper airplane is visible in the display area. Further, some other virtual objects, such as several white icons (white dots as shown in FIG. 6(b)), may also be displayed in the virtual object layer of the second area. FIG. 6(c) is a schematic diagram showing displaying of the virtual object layer of the second area in FIG. 2. In a case that the user gazes at a white dot representing cabin service in the 00s shown in FIG. 6(b), displayed content as shown in FIG. 6(c) may be displayed. As shown in FIG. 6(c), a flight attendant corresponding to the cabin service in the 00s is displayed next to an airplane model.

Figure 7A:
FIG. 7(a) is a schematic diagram showing displaying of a real object layer of a third area in FIG. 2.
Figure 7B:
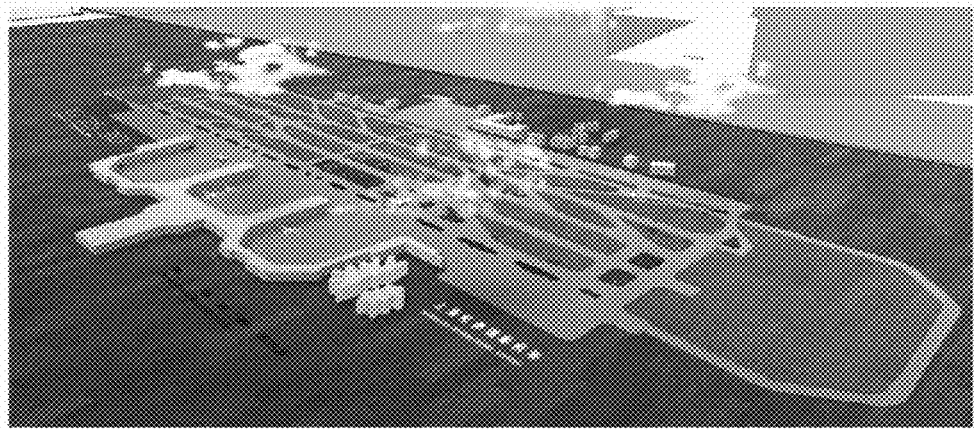
FIG. 7(b) is a schematic diagram showing displaying of a virtual object layer of the third area in FIG. 2.

FIG. 7(a) is a schematic diagram showing displaying of a real object layer of the third area in FIG. 2. As shown in FIG. 7(a), the third area includes a plan view of the entire airport. FIG. 7(b) is a schematic diagram showing displaying of a virtual object layer of the third area in FIG. 2. As shown in FIG. 7(b), a stereo model of the entire airport is displayed in the virtual object layer of the third area, including an airport terminal, a parking apron, an airstrip, and airplanes that arrive, take off, and that are flying in the air. In FIG. 7(b), both the airport terminal and the airplanes are virtual objects corresponding to real objects. Further, in FIG. 7(b), information such as air routes of the airplanes and identification of airlines may also be displayed. The air routes of the airplanes and the identification of airlines are virtual objects to which no real object corresponds.

As described above, the real object layer and the virtual object layer have been described by taking the visiting area shown in FIG. 2 as an example. Practically, the visiting area shown in FIG. 2 and the real object layer and the virtual object layer of each area in the visiting area are illustrative rather than limitative.

According to the embodiment of the present disclosure, in a process that the content determination unit 170 determines displayed content, the content determination unit 170 may cause the displayed other virtual objects not to overlap with the displayed virtual object corresponding to the real object. In this embodiment, as described above, other virtual objects are virtual objects to which no real object corresponds.

Figure 8A:
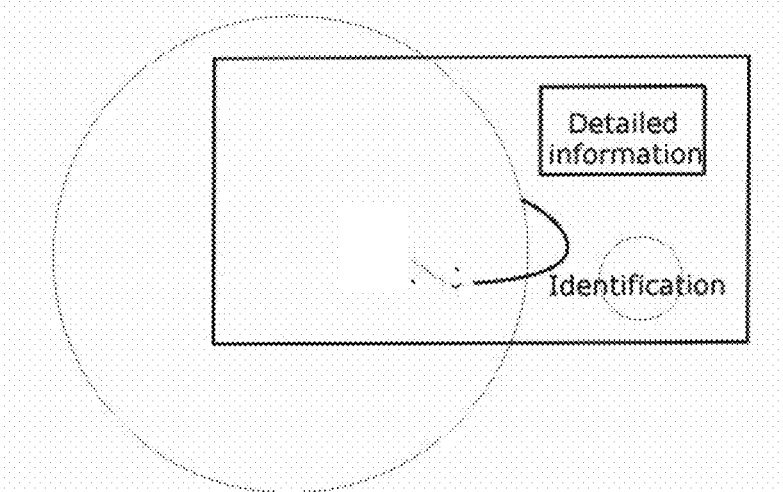
FIG. 8(a) is a schematic diagram showing displaying of displayed content according to an embodiment of the present disclosure.
Figure 8B:
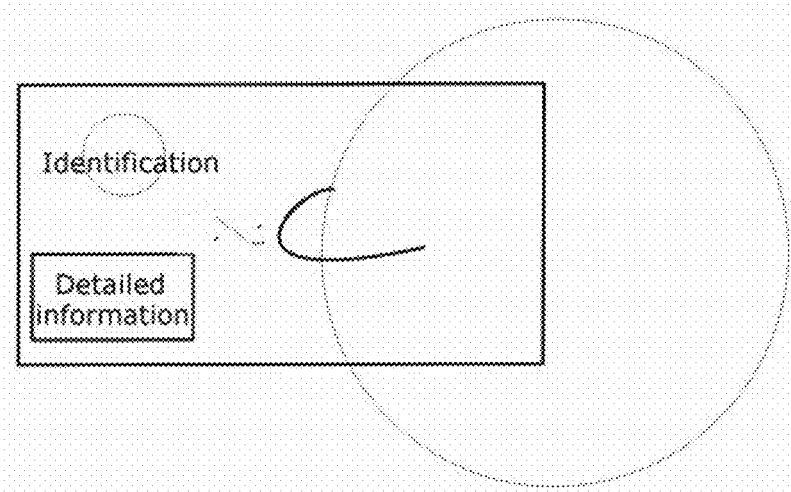
FIG. 8(b) is a schematic diagram showing displaying of displayed content according to another embodiment of the present disclosure.

FIG. 8(a) is a schematic diagram showing displaying of displayed content according to an embodiment of the present disclosure. FIG. 8(b) is a schematic diagram showing displaying of displayed content according to another embodiment of the present disclosure. As shown in FIG. 8(a) and FIG. 8 (b), a larger circle represents the earth in a virtual object layer, an arc represents an air route of the illustrated airplane, and a larger rectangle represents a display area of the electronic apparatus 100. As shown in FIG. 8(a) and FIG. 8(b), detailed information of the air route and identification information of the airline may also be displayed in the display area. In this embodiment, both the earth and the airplane are virtual objects corresponding to real objects, and the detailed information of the air route and the identification information of the airline are virtual objects to which no real object corresponds. As shown in FIG. 8(a) and FIG. 8(b), the detailed information of the air route and the identification information of the airline do not overlap with the earth and the airplane.

As described above, in the process that the content determination unit 170 determines the displayed content, the content determination unit 170 may cause the displayed other virtual objects not to overlap with the displayed virtual object corresponding to the real object. In general, other virtual objects are detailed information or additional information of a virtual object corresponding to a real object. In this way, the virtual object corresponding to the real object can be displayed to the user as completely as possible, and thus the visual feeling can be improved.

According to the embodiment of the present disclosure, the content determination unit 170 may determine audiovisual content of the user based on a distance between a current position of the user and an observed real object. In this embodiment, the audiovisual content may include displayed content and sound content. That is, the content determination unit 170 may determine the displayed content and the sound content presented to the user based on the distance between the current position of the user and the observed real object.

According to the embodiment of the present disclosure, with the content determination unit 170, the amount of information included in the displayed content decreases as the distance between the current position of the user and the observed real object becomes small; and the amount of information included in the displayed content increases as the distance between the current position of the user and the observed real object becomes large.

Figure 9:
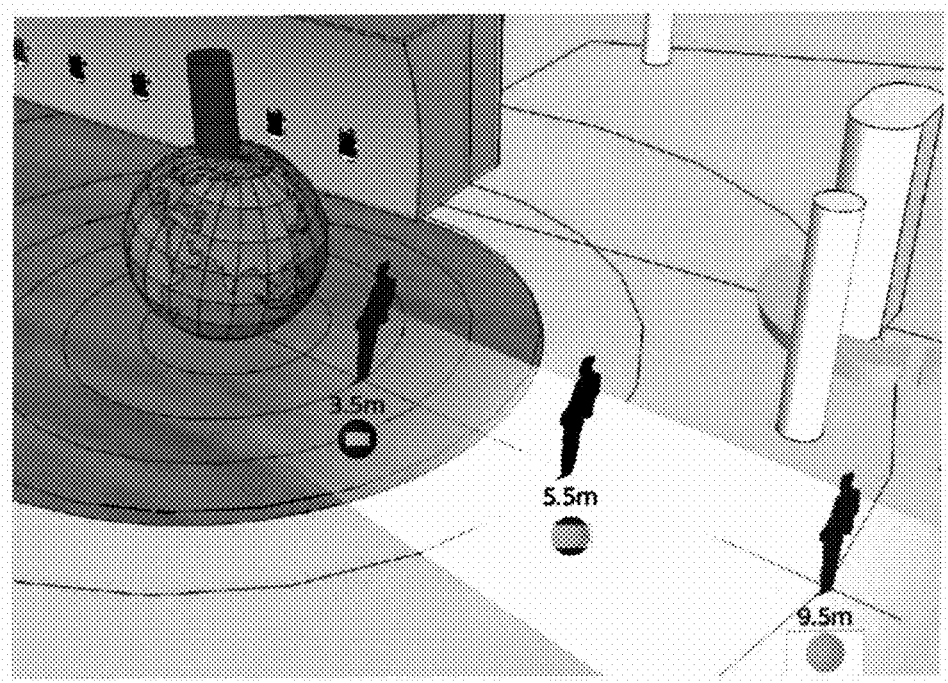
FIG. 9 is a schematic diagram showing that audiovisual content is determined based on a distance between a visitor and a real object in the first area in FIG. 2.

FIG. 9 is a schematic diagram showing that audiovisual content is determined based on a distance between a visitor and a real object in the first area in FIG. 2. As shown in FIG. 9, it is assumed that the user is observing a terrestrial globe. In a case that a distance between the user and the terrestrial globe is 9.5 meters (m), the user can see a full view of the terrestrial globe. In a case that the distance between the user and the terrestrial globe is 5.5 meters (m), the user can see the entire terrestrial globe in a latitude direction of the terrestrial globe, and the user cannot see the entire terrestrial globe in a longitude direction of the terrestrial globe. In other words, the user can only see the terrestrial globe in the vicinity of the equator in a horizontal direction. In a case that the distance between the user and the terrestrial globe is 3.5 meters (m), the user cannot see the entire terrestrial globe in the longitude direction and the longitude direction of the terrestrial globe. In other words, the user can only see a part of areas on the terrestrial globe.

Further, it is assumed that all air route information of multiple airlines and identification information of the airlines are displayed on the terrestrial globe. In this case, if the user is far from the terrestrial globe, for example, a distance between the user and the terrestrial globe is 9.5 meters (m), the user can see all the air route information and the identification information of the airlines around the terrestrial globe. If the user is close to the terrestrial globe, for example, the distance between the user and the terrestrial globe is 5.5 meters (m), the user can see fewer air route information and identification information around the terrestrial globe. In addition, if the user is closer to the terrestrial globe, for example, the distance between the user and the terrestrial globe is 3.5 meters (m), the user can see much less air route information and identification information around the terrestrial globe.

Therefore, as a distance between a current position of the user and an observed real object becomes small, an area of the real object displayed in the displayed content becomes small, i.e., the amount of information included in the displayed content decreases. As the distance between the current position of the user and the observed real object becomes large, the area of the real object displayed in the displayed content becomes large, i.e., the amount of information included in the displayed content increases.

According to the embodiment of the present disclosure, the content determination unit 170 may also determine the sound content presented to the user based on the distance between the current position of the user and the observed real object. In this embodiment, the content determination unit 170 may associate the distance between the current position of the user and the observed real object with the sound content. For example, in the embodiment shown in FIG. 9, in a case that the user is far from the terrestrial globe, the content determination unit 170 may determine that the sound content is a sound in a simulated outer space. In addition, in a case that the user is close to the terrestrial globe, the content determination unit 170 may determine that the sound content is an engine sound of the airplane.

The above description is merely illustrative. The content determination unit 170 may also determine other illustrative sound content and displayed content based on the distance between the current position of the user and the observed real object.

According to the embodiment of the present disclosure, the electronic apparatus 100 may specify a real object that may be observed in each area. For example, the real object that may be observed in the first area is a terrestrial globe, and the real objects that may be observed in the second area are multiple paper airplanes, and the real object that may be observed in the third area is a plan view of the airport terminal. In other words, the real objects that may be observed are main visiting objects in the areas. According to the embodiment of the present disclosure, the user does not need to gaze at an observed real object. Once the electronic apparatus 100 detects that the user faces the observed real object, the electronic apparatus 100 may determine audiovisual content based on the distance between the current position of the user and the observed real object.

According to the embodiment of the present disclosure, the content determination unit 170 may also determine audiovisual content of the user based on a virtual object gazed by the user. Similarly, the audiovisual content may include displayed content and sound content. That is, the content determination unit 170 may determine the displayed content and the sound content presented to the user based on the virtual object gazed by the user.

In an example, in the first area, when the user gazes at identification information of an airline, the identification information of the airline may be highlighted. For example, the highlighting may include displaying the identification information of the airline in a different color from colors of other identifications, and may also include enlarging and displaying the identification information of the airline. In another example, in the second area, when the user gazes at a white icon, a flight attendant corresponding to the icon may be displayed. In another example, in the second area, when the user gazes at a flight attendant, the flight attendant may start to explain related history.

According to the embodiment of the present disclosure, the user may gaze at a virtual object displayed in the display area. In this embodiment, the gazing refers to a process that the user intentionally and continuously looks at a virtual object, that is, the virtual object is in the line-of-sight direction of the user for a certain time period. Therefore, the content determination unit 170 may determine the audiovisual content of the user based on the virtual object gazed by the user, and thus the visual feeling of the user is improved.

According to the embodiment of the present disclosure, the positioning unit 140 may determine the current position of the user based on a distance between the user and a gazed virtual object. In this embodiment, the gazed virtual object may include other virtual objects to which no real object corresponds. For example, several icons of which positions are known are preset in the virtual object layer. The icons may or may not be visible. When the user intentionally or unintentionally gazes at the icons, the positioning unit 140 may measure distances between the user and the icons, and determine the current position of the user based on the distances between the user and the icons. Practically, the above description merely shows an embodiment in which the positioning unit 140 performs positioning on the user. It should be understood by those skilled in the art that the positioning unit 140 may also perform the positioning on the user by using other methods.

According to the embodiment of the present disclosure, the content determination unit 170 may determine whether to display a mode conversion icon based on a distance between a current position of the user and an observed real object.

According to the embodiment of the present disclosure, in a case that the distance between the current position of the user and the observed real object is greater than a distance threshold, the content determination unit 170 determines to display the mode conversion icon. In a case that the distance between the current position of the user and the observed real object is less than or equal to the distance threshold, the content determination unit 170 determines not to display the mode conversion icon. In this embodiment, a virtual object corresponding to the observed real object may be displayed in different modes. For example, in the first area, a simulated earth corresponding to the terrestrial globe may be displayed in three modes. In a first display mode, the real earth is simulated to display the natural landscape of the earth. In a second display mode, the real earth is simulated to display one rotation of the earth. In a third display mode, all air route information of all airlines and identification information of the airlines are displayed. The three display modes for the earth are illustratively described above, and the present disclosure is not limited thereto.

According to the embodiment of the present disclosure, the content determination unit 170 may select a mode conversion icon that is gazed by the user and convert a display mode of the virtual object corresponding to the observed real object based on the selected mode conversion icon.

Figure 10:
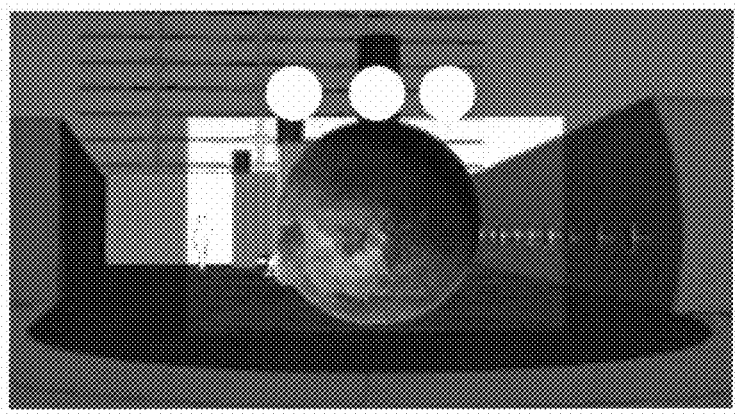
FIG. 10 is a schematic diagram showing displaying of a mode conversion icon in the first area in FIG. 2.

FIG. 10 is a schematic diagram showing displaying of a mode conversion icon in the first area in FIG. 2. As shown in FIG. 10, in the display area, three mode conversion icons (three hollow white circles in FIG. 10) are displayed above the simulated real earth. It is assumed that, a default display mode is a first display mode, and the three mode conversion icons sequentially represent the first display mode, a second display mode, and a third display mode from left to right. When the user gazes at the mode conversion icon in the middle, the content determination unit 170 may determine to select the mode conversion icon, and convert a display mode of the simulated earth to the second display mode.

According to the embodiment of the present disclosure, the content determination unit 170 may also determine audiovisual content of a virtual object corresponding to a real object based on live state information of the real object to simulate the live state information of the real object. In this embodiment, the real object may include, for example, an airplane in the real world, and the live state information of the real object may include live state information such as takeoff, landing, and flying in the air of the airplane. In this embodiment, the electronic apparatus 100 may acquire the live state information of the real object from a server via the communication unit 130 and may continuously update the live state information of the real object.

According to the embodiment of the present disclosure, the content determination unit 170 may simulate the live state information of the real object such that a displayed dynamic state of the virtual object is consistent with a dynamic state of the real object, and played sound content corresponds to the dynamic state of the real object.

In an example, in the third area, real-time dynamic information of all flights in the airport may be displayed via the display unit 160. That is, when a real airplane is taking off, landing or flying in the air in the airport terminal, the user may see that a virtual airplane is taking off, landing or flying in the air with the display unit 160. A dynamic state of the virtual airplane is consistent with a dynamic state of the real airplane. Further, sound content corresponding to the dynamic state of the real airplane may be played via the speaker 180. For example, when the real airplane has just landed, the user may hear an human conversation sound from the speaker 180. In addition, when the real airplane is flying in the air, the user may hear an engine sound of the airplane and/or and a broadcast sound (for example, a flight with a serial number of XXX has taken off) related to the airplane from the speaker 180.

As described above, according to the embodiment of the present disclosure, the content determination unit 170 may simulate the live state information of the real object and present the live state information to the user, thereby increasing the reality of the user feeling, and thus improving the user experience.

According to the embodiment of the present disclosure, the electronic apparatus 100 may be located in a wireless communication system. The wireless communication system may further include a server and a control device. The communication unit 130 may perform information interaction with the server according to a first protocol, and may perform information interaction with the control device according to a second protocol different from the first protocol. Further, the second protocol may have a stronger timeliness than the first protocol. Preferably, the first protocol may be a Hyper Text Transfer Protocol (HTTP), and the second protocol may be a Transmission Control Protocol/Internet Protocol (TCP/IP).

According to the embodiment of the present disclosure, the electronic apparatus 100 may acquire information such as information associated with a real object to be displayed (e.g., live state information of the real object), from the server via the communication unit 130. Further, the electronic apparatus 100 may transmit information of the electronic apparatus to the control device via the communication unit 130. The information of the electronic apparatus includes one or more of power amount information of the electronic apparatus 100, position information of the electronic apparatus 100, and audiovisual content of the electronic apparatus 100.

According to the embodiment of the present disclosure, the wireless communication system may include one or more electronic apparatuses 100. The control device may control the one or more electronic apparatuses 100. The information interaction between the control device and the electronic apparatuses 100 needs a strong timeliness, and the TCP/IP protocol may be used. In addition, the information interaction between the electronic apparatuses 100 and the server does not need a strong timeliness, and the HTTP protocol may be used. Thus reasonable utilization of resources can be achieved.

According to the embodiment of the present disclosure, the control device may display the power amount information and/or the position information of the one or more electronic apparatuses 100 on a display of the control device. In this embodiment, the power amount information of the electronic apparatus 100 may be represented in various ways, for example, by a percentage or a power amount level. The position information of the electronic apparatus 100 may also be represented in various ways, for example, by a serial number for the area where the electronic apparatus 100 is located.

According to the embodiment of the present disclosure, the control device may also select one electronic apparatus 100 and synchronously present current audiovisual content including displayed content and sound content of the electronic apparatus 100.

Figure 11:
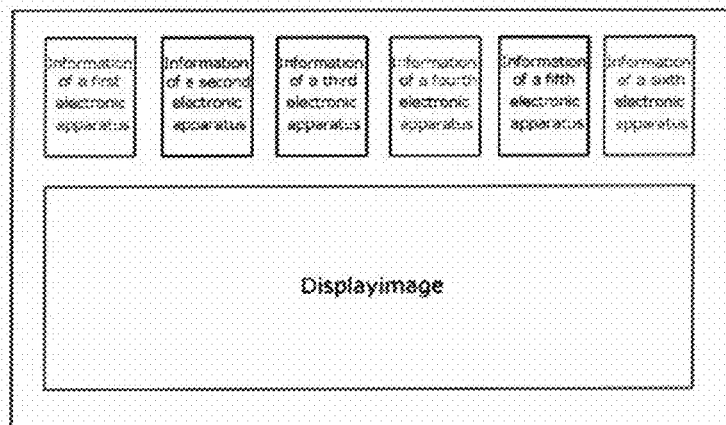
FIG. 11 is a schematic diagram showing content displayed on a display of a control device according to an embodiment of the present disclosure.

FIG. 11 is a schematic diagram showing content displayed on a display of a control device according to an embodiment of the present disclosure. As shown in FIG. 11, it is assumed that the control device may control six electronic apparatuses 100. The information of the six electronic apparatuses, including power amount information and/or position information, may be separately displayed in the upper portion of the display of the control device. Further, the displayed content of one electronic apparatus among the six electronic apparatuses may also be synchronously displayed in an image display area in the lower portion of the display of the control device, and the sound content of the electronic apparatus may also be synchronously played via the speaker of the control device.

Therefore, according to the embodiment of the present disclosure, the control device may acquire information of multiple electronic apparatuses so as to manage the electronic apparatuses. In addition, a user carrying or wearing the control device may synchronously watch and listen to the same audiovisual content as that of one electronic apparatus.

As described above, the electronic apparatus 100 according to the embodiment of the present disclosure may determine the current audiovisual angle of the user, generate the indication information, perform the positioning on the user, record the travel history of the user, determine the audiovisual content to be presented to the user, display the displayed content in the audiovisual content, play the sound content in the audiovisual content, communicate with other devices, and the like. According to the embodiment of the present disclosure, some functions of the above functions may also be implemented by a server.

According to the embodiment of the present disclosure, the electronic apparatus 100 may determine the current audiovisual angle of the user and transmit the current audiovisual angle to the server. The server determines the expected audiovisual angle and generates the indication information by comparing the current audiovisual angle of the user and the expected audiovisual angle. Further, the server may transmit the indication information to the electronic apparatus 100 so as to be provided to the user. Further, the electronic apparatus 100 may determine the current position of the user and transmit the current position of the user to the server, and the server determines the expected audiovisual angle based on the current position of the user. In addition, the electronic apparatus 100 may also record the travel history of the user and transmit the travel history of the user to the server, and the server may also determine the expected audiovisual angle based on the travel history information of the user. Further, the server may also determine the audiovisual content of the user based on the distance between the current position of the user and the observed real object, may also determine whether to display the mode conversion icon based on the distance between the current position of the user and the observed real object, may also determine the audiovisual content of the virtual object corresponding to the real object based on the live state information of the real object, and the like. The above processes are similar to processes that the electronic apparatus 100 performs the functions, in addition to the main body performing the functions. Therefore, all the embodiments in which the electronic apparatus 100 performs the functions are applicable, which are not be repeated herein.

As described above, various embodiments of the present disclosure have been described by taking the scenario in which the visiting area shown in FIG. 2 is visited as an example. It should be understood by those skilled in the art that the present disclosure is not limited to such examples. The present disclosure may be applied in all scenarios in which a user using a VR device needs to be directed.

Therefore, with the electronic apparatus 100 according to the present disclosure, the indication information can be generated by comparing the current audiovisual angle of the user with the expected audiovisual angle to direct the user to the expected audiovisual angle. Further, the electronic apparatus 100 can also more reasonably determine the audiovisual content presented to the user, so that the user can obtain a better visual feeling, and thus the user experience can be improved.

2. Configuration Example of Wireless Communication System

Figure 12:
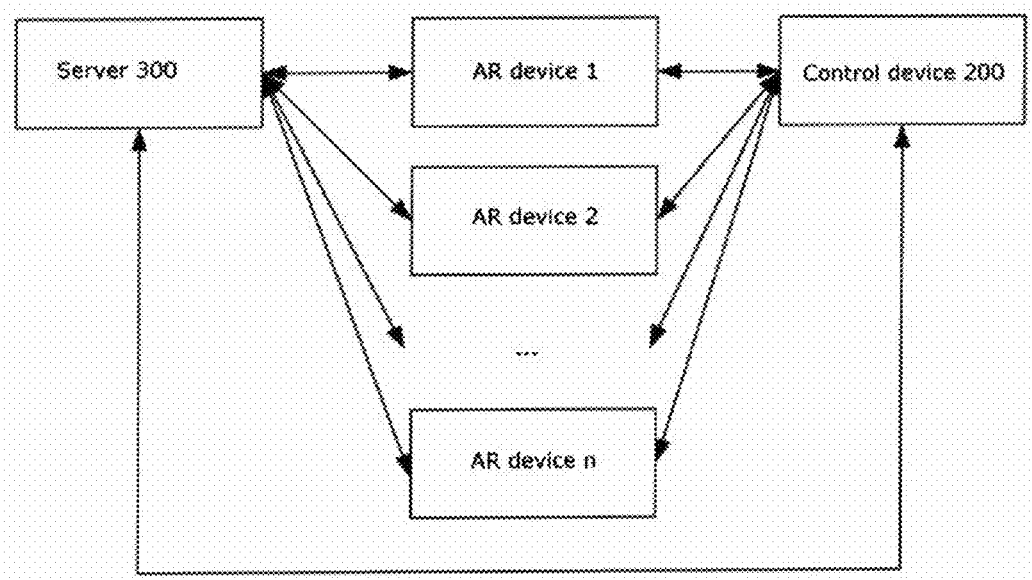
FIG. 12 is a schematic diagram showing a structure of a wireless communication system according to an embodiment of the present disclosure.

FIG. 12 is a schematic diagram showing a structure of a wireless communication system according to an embodiment of the present disclosure. As shown in FIG. 12, the wireless communication system includes multiple AR devices (i.e., an AR device 1, an AR device 2, . . . , and an AR device n), a server 300, and a control device 200. Although FIG. 12 shows a case that the wireless communication system includes multiple AR devices, the wireless communication system may also include one AR device.

According to the embodiment of the present disclosure, each AR device may be a user device, i.e., may be carried or worn by a user (for example, a visitor), and each AR device may be implemented by the electronic apparatus 100 described above. Therefore, all the embodiments described above with respect to the electronic apparatus 100 are applicable. That is, each AR device may be configured to: determine a current audiovisual angle of the user wearing or carrying the AR device, compare the current audiovisual angle of the user with an expected audiovisual angle and generate indication information for directing the user to the expected audiovisual angle, and provide the indication information to the user. The indication information directs the user to the expected audiovisual angle by using a direct direction indication and an indirect direction indication.

According to the embodiment of the present disclosure, the control device 200 may be a user device, i.e., may be carried or worn by a user (for example, a manager managing a visitor). The control device 200 may communicate with each AR device to display information of each AR device.

According to the embodiment of the present disclosure, the server 300 may communicate with each AR device to transmit information associated with a real object to be displayed to each AR device.

According to the embodiment of the present disclosure, each AR device may communicate with the server 300 according to a first protocol. Preferably, the first protocol may be a HTTP. Each AR device may communicate with the control device 200 according to a second protocol. Preferably, the second protocol may be a TCP/IP. In addition, the server 300 may also communicate with the control device 200 according to the first protocol.

According to the embodiment of the present disclosure, the control device 200 may acquire one or more of the following information of each AR device: power amount information of the AR device, position information of the AR device, and audiovisual content of the AR device.

According to the embodiment of the present disclosure, the control device 200 may display one or more of the above information of each AR device. Specifically, in a case that the control device 200 acquires the power amount information of the AR device, the power amount information of the AR device may be displayed on the display of the control device 200, for example, in an area denoted by "information of an x-th electronic apparatus" shown in FIG. 11, where x represents a serial number of the corresponding AR device. In a case that the control device 200 acquires the position information of the AR device, the position information of the AR device may be displayed on the display of the control device 200, for example, in an area denoted by "information of the x-th electronic apparatus" shown in FIG. 11, where x represents the serial number of the corresponding AR device. In this embodiment, the position information of the AR device may be represented by the area where the AR device is located. For example, if a first AR device is located in the second area, information such as "the first electronic apparatus is located in the second area" may be displayed in the area denoted by "information of the first electronic apparatus". In addition, the control device 200 may also acquire the audiovisual content of each AR device and synchronously display the audiovisual content of the AR device. For example, displayed content in the audiovisual content may be displayed in the area denoted by "displaying image" shown in FIG. 11, and sound content in the audiovisual content may be played by the speaker of the control device 200.

Therefore, the control device 200 may acquire the position and the power amount of each AR device so as to manage the AR device. In addition, the control device 200 may also synchronously play the audiovisual content of the AR device, so that a user carrying or wearing the control device 200 can watch and listen.

The wireless communication system according to the present disclosure may be applied in various scenarios. For example, in a scenario in which a visiting area is visited, each AR device may be carried or worn by a visitor, the control device 200 may be carried or worn by a manager of the visiting area, and the server may be located in or near the visiting area. In a shopping scenario in a supermarket or shopping mall, each AR device may be carried or worn by a customer, the control device 200 may be carried or worn by a manager of the supermarket or shopping mall, and the server may be located in or near the supermarket or shopping mall. That is, the wireless communication system according to the present disclosure may be applied in all scenarios in which a user needs to be directed. In the scenarios, the user can be better directed so that the user can obtain a better visual feeling, and thus the user experience can be improved.

3. Configuration Example of Wireless Communication Method

A wireless communication method according to an embodiment of the present disclosure is described below in detail. The wireless communication method may be performed by an electronic apparatus carried or worn by a user, i.e., the electronic apparatus 100 described above.

Figure 13:
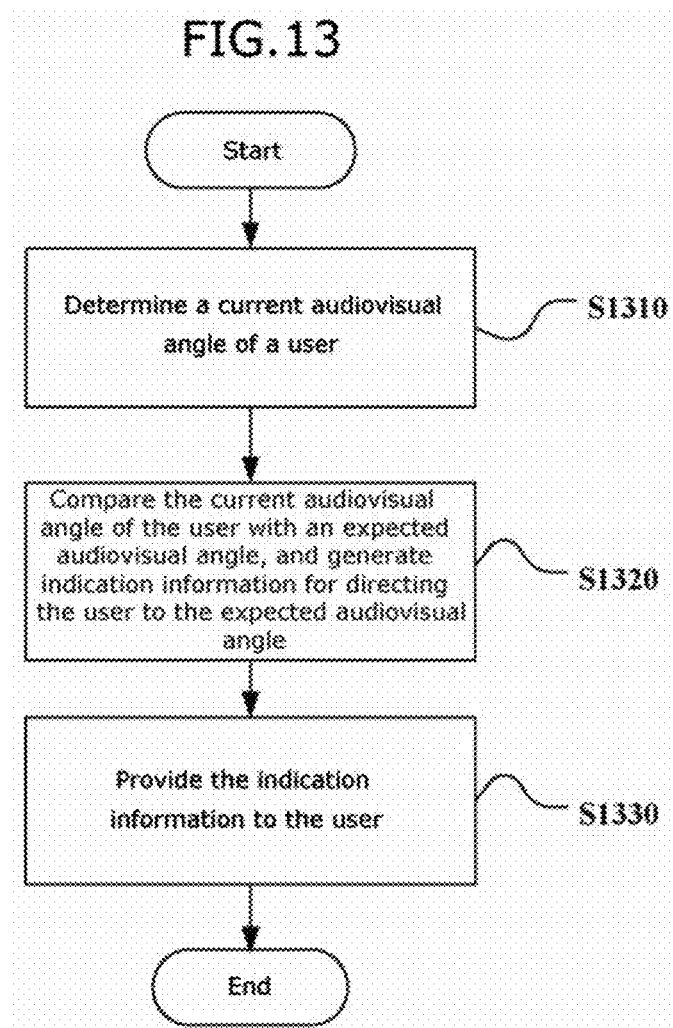
FIG. 13 is a flowchart showing a wireless communication method according to an embodiment of the present disclosure.

FIG. 13 is a flowchart showing a wireless communication method according to an embodiment of the present disclosure.

As shown in FIG. 13, in step S1310, a current audiovisual angle of a user is determined.

Next, in step S1320, the current audiovisual angle of the user is compared with an expected audiovisual angle, and indication information for directing the user to the expected audiovisual angle is generated.

Next, in step S1330, the indication information is provided to the user.

In this embodiment, the indication information directs the user to the expected audiovisual angle by using a direct direction indication and an indirect direction indication.

Preferably, generating the indication information further includes: generating information on a direction of the expected audiovisual angle.

Preferably, the direct direction indication is used to direct the user to the direction of the expected audiovisual angle with an explicit visual identification. The explicit visual identification is provided in a first display area of an electronic apparatus.

Preferably, the explicit visual identification includes an icon identification.

Preferably, the indirect direction indication is used to direct the user to the direction of the expected audiovisual angle with an aural identification or an implicit visual identification. The implicit visual identification is provided in a second display area of the electronic apparatus.

Preferably, the aural identification prompts the user for an aural source direction, and the implicit visual identification prompts the user for a visual source direction.

Preferably, the indirect direction indication is used to indicate information associated with an area in the direction of the expected audiovisual angle. The information associated with the area in the direction of the expected audiovisual angle includes one or more of sound information associated with the area, light information associated with the area, and animation information associated with the area.

Preferably, generating the indication information further includes: determining the expected audiovisual angle based on a current position of the user.

Preferably, generating the indication information further includes: determining the expected audiovisual angle based on travel history information of the user.

Preferably, the method further includes: displaying displayed content in a display area of the electronic apparatus. The displayed content includes a real object layer and a virtual object layer. The virtual object layer includes a virtual object corresponding to a real object and other virtual objects not overlapping with the virtual object corresponding to the real object.

Preferably, the method further includes: determining audiovisual content of the user based on a distance between a current position of the user and an observed real object.

Preferably, the method further includes: determining the current position of the user based on a distance between the user and a gazed virtual object.

Preferably, the method further includes: determining whether to display a mode conversion icon based on a distance between a current position of the user and an observed real object; and selecting the mode conversion icon that is gazed by the user, and converting a display mode of a virtual object corresponding to the observed real object based on the selected mode conversion icon.

Preferably, the method further includes: determining, based on live state information of a real object, audiovisual content of a virtual object corresponding to the real object to simulate the live state information of the real object.

Preferably, simulating the live state information of the real object includes: simulating the live state information of the real object such that a displayed dynamic state of the virtual object is consistent with a dynamic state of the real object and displayed sound content corresponds to the dynamic state of the real object.

Preferably, the electronic apparatus is an augmented reality AR device. The AR device is used to be worn or carried by the user.

Preferably, the method further includes: performing information interaction with a server according to a first protocol to acquire information associated with a real object to be displayed from the server; and performing information interaction with a control device according to a second protocol different from the first protocol to transmit information of the electronic apparatus to the control device.

Preferably, transmitting the information of the electronic apparatus to the control device includes: transmitting one or more of power amount information of the electronic apparatus, position information of the electronic apparatus and audiovisual content of the electronic apparatus to the control device.

According to the embodiment of the present disclosure, the wireless communication method described above may be performed by the electronic apparatus 100 according to an embodiment of the present disclosure. Therefore, all the embodiments described above with respect to the electronic apparatus 100 are applicable.

4. Application Example

The technology of the present disclosure can be applied to various products.

For example, the server 300 may be implemented as any type of servers, such as a tower server, a rack server, and a blade server. The server 300 may be a control module (such as an integrated circuit module including a single wafer, and a card or blade inserted into a slot of the blade server) installed on the server.

The electronic apparatus 100 and the control device 200 may be user devices implemented as mobile terminals (such as a smartphone, a tablet personal computer (PC), a notebook PC, a portable game terminal, a portable/dongle mobile router, and a digital camera). The user device may also be implemented as a terminal (which is also referred to as a machine-type communication (MTC) terminal) that performs machine-to-machine (M2M) communication. In addition, the user device may be a wireless communication module (such as an integrated circuit module including a single wafer) mounted on each of the user devices. Particularly, the electronic apparatus 100 may be a VR device such as a wearable VR device (e.g., VR glasses, a VR helmets), or other user devices (e.g., a smartphone with dual cameras) capable of implementing the VR function.

Application Example on User Device

Figure 14:
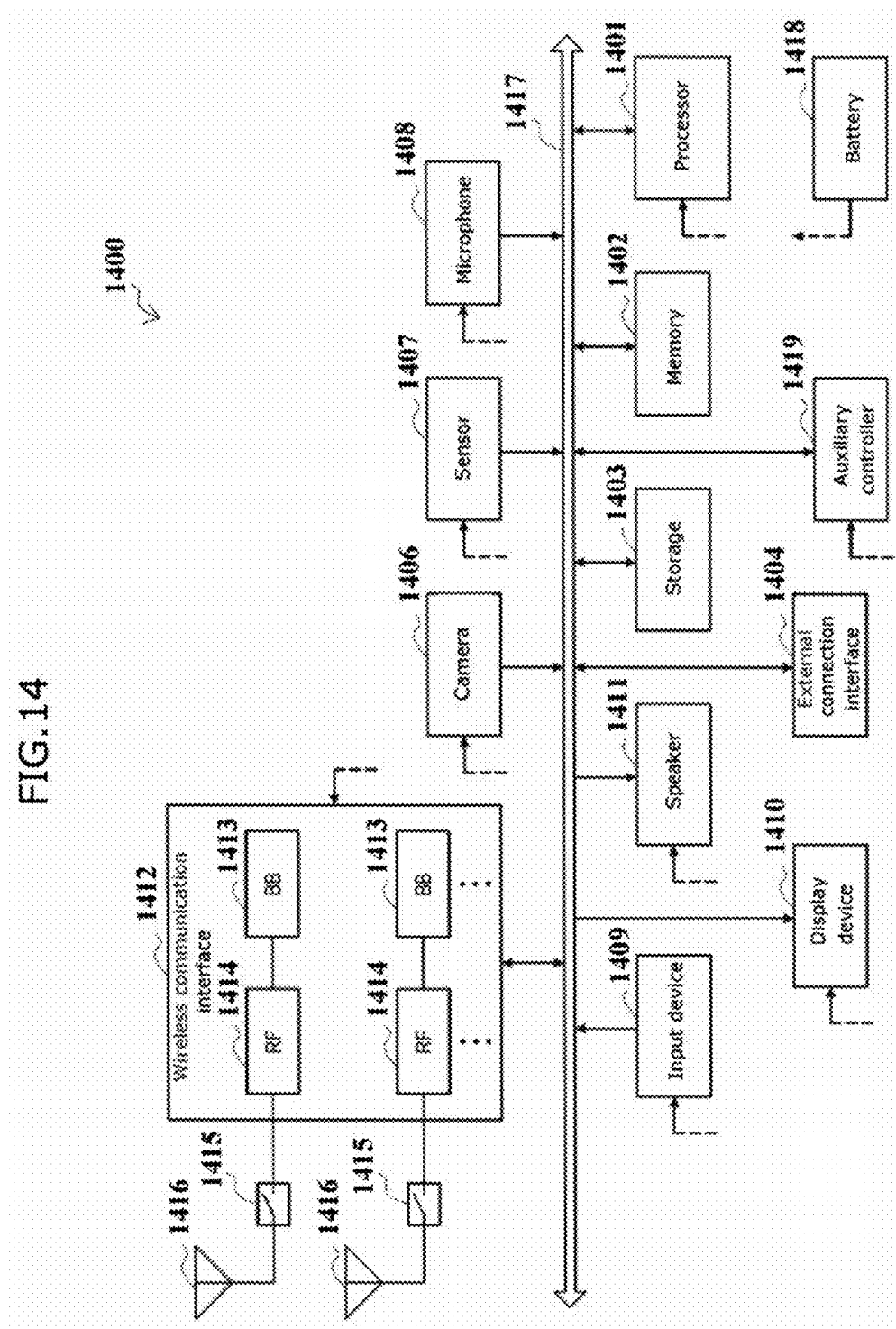
FIG. 14 is a block diagram showing a schematic configuration example of a smartphone.

FIG. 14 is a block diagram showing a schematic configuration example of a smartphone 1400 to which the technology of the present disclosure may be applied. The smartphone 1400 includes a processor 1401, a memory 1402, a storage 1403, an external connection interface 1404, a camera 1406, a sensor 1407, a microphone 1408, an input device 1409, a display device 1410, a speaker 1411, a wireless communication interface 1412, one or more antenna switches 1415, one or more antennas 1416, a bus 1417, a battery 1418, and an auxiliary controller 1419.

The processor 1401 may be, for example, a CPU or a system on a chip (SoC), and controls functions of an application layer and another layer of the smartphone 1400. The memory 1402 includes RAM and ROM, and stores a program that is executed by the processor 1401 and data. The storage 1403 may include a storage medium such as a semiconductor memory and a hard disk. The external connection interface 1404 is an interface for connecting an external device (such as a memory card and a universal serial bus (USB) device) to the smartphone 1400.

The camera 1406 includes an image sensor (such as a charge coupled device (CCD) and a complementary metal oxide semiconductor (CMOS)), and generates a captured image. The sensor 1407 may include a group of sensors such as a measurement sensor, a gyro sensor, a geomagnetic sensor and an acceleration sensor. The microphone 1408 converts sounds that are inputted to the smartphone 1400 to audio signals. The input device 1409 includes, for example, a touch sensor configured to detect touch onto a screen of the display device 1410, a keypad, a keyboard, a button or a switch, and receives an operation or information inputted from a user. The display device 1410 includes a screen (such as a liquid crystal display (LCD) and an organic light-emitting diode (OLED) display), and displays an output image of the smartphone 1400. The speaker 1411 converts audio signals outputted from the smartphone 1400 to sounds.

The wireless communication interface 1412 supports any cellular communication scheme (such as LET and LTE-Advanced), and performs wireless communication. The wireless communication interface 1412 may typically include, for example, a BB processor 1413 and an RF circuit 1414. The BB processor 1413 may perform, for example, encoding/decoding, modulating/demodulating, and multiplexing/demultiplexing, and performs various types of signal processing for wireless communication. In addition, the RF circuit 1414 may include, for example, a mixer, a filter and an amplifier, and transmits and receives wireless signals via the antenna 1416. The wireless communication interface 1412 may be a chip module having the BB processor 1413 and the RF circuit 1414 integrated thereon. As shown in FIG. 14, the wireless communication interface 1412 may include the multiple BB processors 1413 and the multiple RF circuits 1414. Although FIG. 14 shows the example in which the wireless communication interface 1412 includes the multiple BB processors 1413 and the multiple RF circuits 1414, the wireless communication interface 1412 may also include a single BB processor 1413 or a single RF circuit 1414.

Furthermore, in addition to a cellular communication scheme, the wireless communication interface 1412 may support another type of wireless communication scheme such as a short-distance wireless communication scheme, a near field communication scheme, and a wireless local area network (LAN) scheme. In that case, the wireless communication interface 1412 may include the BB processor 1413 and the RF circuit 1414 for each wireless communication scheme.

Each of the antenna switches 1415 switches connection destinations of the antennas 1416 among multiple circuits (such as circuits for different wireless communication schemes) included in the wireless communication interface 1412.

Each of the antennas 1416 includes a single or multiple antenna elements (such as multiple antenna elements included in an MIMO antenna), and is used for the wireless communication interface 1412 to transmit and receive wireless signals. As shown in FIG. 14, the smartphone 1400 may include the multiple antennas 1416. Although FIG. 14 shows the example in which the smartphone 1400 includes the multiple antennas 1416, the smartphone 1400 may also include a single antenna 1416.

Furthermore, the smartphone 1400 may include the antenna 1416 for each wireless communication scheme. In that case, the antenna switches 1415 may be omitted from the configuration of the smartphone 1400.

The bus 1417 connects the processor 1401, the memory 1402, the storage 1403, the external connection interface 1404, the camera 1406, the sensor 1407, the microphone 1408, the input device 1409, the display device 1410, the speaker 1411, the wireless communication interface 1412, and the auxiliary controller 1419 to each other. The battery 1418 supplies power to blocks of the smartphone 1400 shown in FIG. 14 via feeder lines, which are partially shown as dashed lines in the FIG. 14. The auxiliary controller 1419 operates a minimum necessary function of the smartphone 1400, for example, in a sleep mode.

In the smartphone 1400 shown in FIG. 14, the angle determination unit 110, the generation unit 120, the positioning unit 140, the recording unit 150, the display unit 160, the content determination unit 170, the speaker 180 described with reference to FIG. 1 may be implemented by the processor 1401 or the auxiliary controller 1419. At least part of the functions may also be implemented by the processor 1401 or the auxiliary controller 1419. For example, the processor 1401 or the auxiliary controller 1419 may perform functions of determining a current audiovisual angle, generating indication information, performing positioning on a user, recording travel history of the user, determining audiovisual content, displaying displayed content, and playing sound content by executing instructions stored in the memory 1402 or the storage 1403.

Application Example on Server

Figure 15:
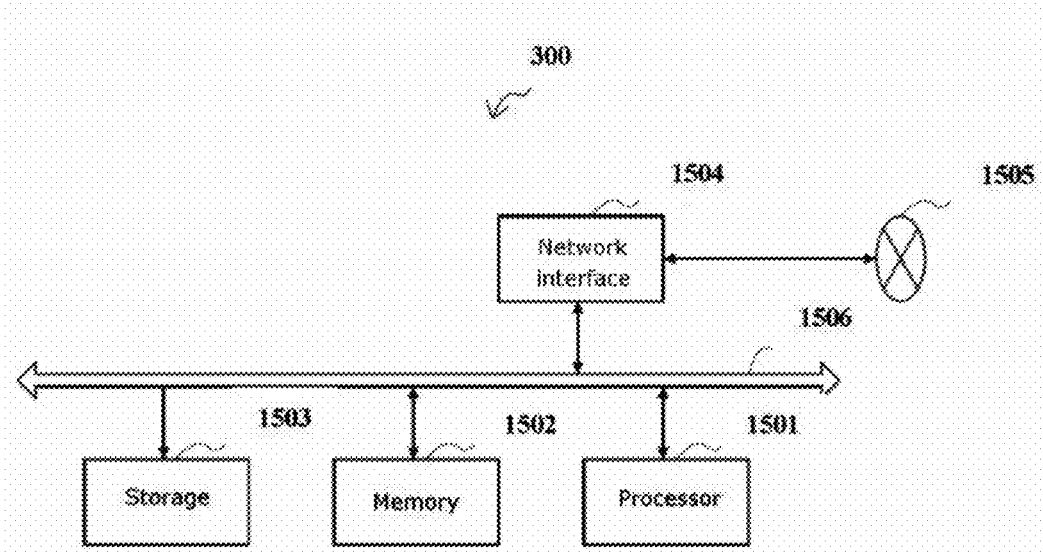
FIG. 15 is a block diagram showing a schematic configuration example of a server.

FIG. 15 is a block diagram showing an example of a server 300 according to the present disclosure. The server 300 includes a processor 1501, a memory 1502, a storage 1503, a network interface 1504, and a bus 1506.

The processor 1501 may be, for example, a central processing unit (CPU) or a digital signal processor (DSP), and controls functions of the server 300. The memory 1502 includes a random access memory (RAM) and a read only memory (ROM), and stores a program that is executed by the processor 1501 and data. The storage 1503 may include a storage medium such as a semiconductor memory and a hard disk.

The network interface 1504 is a wired communication interface for connecting the server 300 to a wired communication network 1505. The wired communication network 1505 may be a core network such as an evolved packet core network (EPC) or a packet data network (PDN) such as the Internet.

The bus 1506 connects the processor 1501, the memory 1502, the storage 1503, and the network interface 1504 to each other. The bus 1506 may include two or more buses each having a different speed (such as a high speed bus and a low speed bus).

Although the preferred embodiments of the present disclosure have been described above with reference to the drawings, the present disclosure is not limited to the above examples. It should be understood that, those skilled in the art may make various variations and modifications to the present disclosure within the scope of the appended claims, and the variations and modifications naturally fall within the technical scope of the present disclosure.

For example, the units shown by dashed boxes in the functional block diagrams shown in the drawings indicate that the functional units are optional in the respective devices, and the optional functional units may be combined in an appropriate manner to achieve required functions.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Practically, such a configuration is included in the technical scope of the present disclosure.

In this specification, steps described in the flowcharts include not only processes performed in time series in the described order but also processes performed in parallel or individually rather than necessarily in time series. In addition, even in the steps processed in time series, the order may be appropriately changed.

Although the embodiments of the present disclosure have been described above in detail in connection with the drawings, it should be understood that the embodiments described above are merely illustrative rather than limitative for the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus associated with a user, comprising a processing circuit configured to:
   acquire an expected direction of the user based on a current location and a current viewing angle of the user;
   provide a first indication and a second indication for directing the user to the expected direction,
   wherein the first indication is a direct direction indication and the second indication is an indirect direction indication,
   wherein the indirect direction indication indicates information associated with an area in the direction of the expected direction, and
   wherein the information associated with the area in the direction of the expected direction comprises light brightness information associated with the area;
   display an object to the user when the user goes toward the expected direction; and
   provide information associated with the object based on a distance between the user and the object,
   wherein the information associated with the object includes at least one of visual content and sound content.

2. The electronic apparatus according to claim 1, wherein the object is associated with a real object.

3. The electronic apparatus according to claim 1, wherein the sound content is sound associated with actual sounds that can be heard by the user according to the distance between the user and the object.

4. The electronic apparatus according to claim 1, wherein the processing circuit is further configured to
   provide sound not associated with the object as the sound content when the distance between the user and the object satisfies a first condition; and
   provide sound associated with the object as the sound content when the distance between the user and the object satisfies a second condition.

5. The electronic apparatus according to claim 1, wherein the processing circuit is further configured to
   provide first visual content based on a first distance between the user and the object; and
   provide second visual content based on a second distance longer than the first distance between the user and the object.

6. The electronic apparatus according to claim 1, wherein the processing circuit is further configured to
   provide a display mode conversion icon as at least part of the visual content if the distance between the user and the object satisfies a condition.

7. The electronic apparatus according to claim 1,
wherein the information associated with the area in the direction of the expected direction further includes sound information associated with the area and animation information associated with the area,
wherein a portion of the sound information is a sound information from an aural source located in the area and that can be heard in a case that the user is located in the area,
wherein the light information associated with the area is a light information from a visual source located in the area and that can be seen in a case that the user is located in the area, and
wherein a portion of the animation information from a visual source located in the area and that can be seen in a case that the user is located in the area.

8. The electronic apparatus according to claim 1, wherein the processing circuit is further configured to
determine the current location and the viewing angle of the user;
transmit the current location and the viewing angle to a server; and
receive control information from the server regarding the first and second indication, the object and information associated with the object thereof.

9. The electronic apparatus according to claim 1, wherein the electronic apparatus is an augmented reality (AR) apparatus.

10. An electronic apparatus associated with a server, comprising processing circuit configured to:
determine an expected direction of a user based on a current location and a current viewing angle of the user;
generate a first indication and a second indication for directing the user to the expected direction;
control an electronic apparatus associated with the user to display an object to the user when the user goes towards the expected direction;
generate information associated with the object based on a distance between the user and the object;
wherein the first indication is a direct direction indication and the second indication is an indirect direction indication,
wherein the indirect direction indication indicates information associated with an area in the direction of the expected direction, and
wherein the information associated with the area in the direction of the expected direction comprises light brightness information associated with the area,
wherein the information associated with the object includes at least one of visual content and sound content.

11. The electronic apparatus according to claim 10, wherein the object is associated with a real object.

12. The electronic apparatus according to claim 10, wherein the sound content is sound associated with actual sounds that can be heard by the user according to the distance between the user and the object.

13. The electronic apparatus according to claim 10, wherein the processing circuit is further configured to
generate sound not associated with the object as the sound content when the distance between the user and the object satisfies a first condition; and
generate sound associated with the object as the sound content when the distance between the user and the object satisfies a second condition.

14. The electronic apparatus according to claim 10, wherein the processing circuit is further configured to
generate first visual content based on a first distance between the user and the object; and
generate second visual content based on a second distance longer than the first distance between the user and the object.

15. The electronic apparatus according to claim 10, wherein the processing circuit is further configured to generate display mode conversion icon as at least part of the visual content if the distance between the user and the object satisfies a condition.

16. A non-transient computer readable medium containing program instructions for causing a processor to perform the method of:
acquiring an expected direction of a user based on a current location and a current viewing angle of the user;
providing a first indication and a second indication for directing the user to the expected direction,
wherein the first indication is a direct direction indication and the second indication is an indirect direction indication,
wherein the indirect direction indication indicates information associated with an area in the direction of the expected direction, and
wherein the information associated with the area in the direction of the expected direction comprises light brightness information associated with the area;
displaying an object to the user when the user goes toward the expected direction; and
providing information associated with the object based on a distance between the user and the object,
wherein the information associated with the object includes at least one of visual content and sound content.

17. The non-transient computer readable medium according to claim 16, wherein the sound content is sound associated with actual sounds that can be heard by the user according to the distance between the user and the object.

18. The non-transient computer readable medium according to claim 16, wherein the method further includes:
providing sound not associated with the object as the sound content when the distance between the user and the object satisfies a first condition; and
providing sound associated with the object as the sound content when the distance between the user and the object satisfies a second condition.

19. A method of providing an augmented reality to a user of an electronic apparatus, the method comprising:
acquiring an expected direction of the user based on a current location and a current viewing angle of the user;
providing a first indication and a second indication for directing the user to the expected direction,
wherein the first indication is a direct direction indication and the second indication is an indirect direction indication,
wherein the indirect direction indication indicates information associated with an area in the direction of the expected direction, and
wherein the information associated with the area in the direction of the expected direction comprises light brightness information associated with the area;
displaying an object to the user when the user goes toward the expected direction; and
providing information associated with the object based on a distance between the user and the object, wherein the information associated with the object includes at least one of visual content and sound content.

20. The electronic apparatus according to claim 10,
wherein the information associated with the area in the direction of the expected direction further includes sound information associated with the area and animation information associated with the area,
wherein a portion of the sound information is a sound information from an aural source located in the area and that can be heard in a case that the user is located in the area,
wherein the light information associated with the area is a light information from a visual source located in the area and that can be seen in a case that the user is located in the area, and
wherein a portion of the animation information from a visual source located in the area and that can be seen in a case that the user is located in the area.

21. The non-transient computer readable medium according to claim 16,
wherein the information associated with the area in the direction of the expected direction further includes sound information associated with the area and animation information associated with the area,
wherein a portion of the sound information is a sound information from an aural source located in the area and that can be heard in a case that the user is located in the area,
wherein the light information associated with the area is a light information from a visual source located in the area and that can be seen in a case that the user is located in the area, and
wherein a portion of the animation information from a visual source located in the area and that can be seen in a case that the user is located in the area.

22. The method according to claim 19,
wherein the information associated with the area in the direction of the expected direction further includes sound information associated with the area and animation information associated with the area,
wherein a portion of the sound information is a sound information from an aural source located in the area and that can be heard in a case that the user is located in the area,
wherein the light information associated with the area is a light information from a visual source located in the area and that can be seen in a case that the user is located in the area, and
wherein a portion of the animation information from a visual source located in the area and that can be seen in a case that the user is located in the area.

* * * * *